United States Patent [19]

Abe

[11] 4,274,533
[45] Jun. 23, 1981

[54] DEVICE FOR AUTOMATICALLY GUIDING AND REGULATING TRAVEL OF BOTTLES OR THE LIKE IN A CONVEYING SYSTEM

[75] Inventor: Ichiro Abe, Takasaki, Japan

[73] Assignee: Kirin Beer Kabushiki Kaisha, Tokyo, Japan

[21] Appl. No.: 45,705

[22] Filed: Jun. 5, 1979

[30] Foreign Application Priority Data

Jun. 15, 1978 [JP] Japan ............................. 53/82300[U]

[51] Int. Cl.³ ............................................ B65G 29/00
[52] U.S. Cl. .................................... 198/450; 198/447
[58] Field of Search ............... 198/450, 441, 447, 449, 198/448, 481

[56] References Cited

U.S. PATENT DOCUMENTS 2,108,522   2/1938   Bergmann ............................. 198/450
2,829,757   4/1958   Breebalk .......................... 198/450 X

FOREIGN PATENT DOCUMENTS 568518   11/1957   Italy ......................................... 198/448

Primary Examiner—Robert B. Reeves
Assistant Examiner—Douglas D. Watts
Attorney, Agent, or Firm—Ladas & Parry

[57] ABSTRACT

In a system for conveying bottles or like articles, bottles being conveyed in single file along two or more separate paths are caused to merge and travel in single file along a single path by a device comprising arcuate guide passages and star wheels rotatably supported in concentric relation thereto, each star wheel having a plurality of teeth with respective outer tips lying in a rotational path extending partly into the guide passage, each tooth having a special profile shape defined by leading and trailing edges, the leading edge having a concave arcuate shape of a radius of curvature which substantially corresponds to the radius of said circular cross section and extending from the tip inward to smoothly join the inner end of the trailing edge of the forwardly adjacent tooth, said trailing edge having a convex curved shape and extending outward to the tip of said adjacent tooth, said leading and trailing edges thereby forming a fair S-shaped curve.

5 Claims, 8 Drawing Figures

DEVICE FOR AUTOMATICALLY GUIDING AND REGULATING TRAVEL OF BOTTLES OR THE LIKE IN A CONVEYING SYSTEM

BACKGROUND OF THE INVENTION

This invention relates generally to systems for automatically handling and conveying articles of circular cross section such as bottles. More particularly, the invention relates to a device for automatically regulating the timing of each of a plurality of bottles or the like (hereinafter referred to collectively as bottles) supplied in a single file and sending the same to a succeeding process step. In a particular aspect thereof, the invention relates to the device applied to the combining of a plurality of rows of single-file bottles into a single file in a smooth and orderly manner.

Among the methods known heretofore for collecting bottles that are being continuously supplied, there are the method of collection by merely using guides for merging thereby to force the bottles together and the method depending on the use of worm screws whose spacing intervals continuously vary. The former method, however, has a drawback in that the bottles contact and rub violently with each other, whereby bottles are damaged and cause much noise. The latter method tends to require elaborate-scale and expensive equipment for reasons such as the difficulty in fabricating the screws, the necessity of driving power in all cases, and the necessity of synchronism for intercoupling to other devices.

While bottles are reused by recovering, in general, their serviceable lives are greatly influenced by their handling. Particularly when bottles are being collected in a bottling process, the bottles are easily damaged. When a bottle is thus damaged, it can no longer be used as a commercial commodity or as a container of a commerical commodity.

SUMMARY OF THE INVENTION

It is an object of this invention to provide, in a system for conveying bottles, a device of very simple construction for automatically guiding and regulating the travel of the bottles by which device the bottles are prevented from colliding with each other particularly in the case where they are collected thereby to prevent damage to the bottles and generation of noise.

According to this invention in a fundamental aspect thereof, briefly summarized, there is provided, in a conveying system for conveying articles of circular cross section in directions perpendicular to the centerlines of the articles, a device for automatically guiding and regulating the travel of the articles, said device comprising guide structures defining at least one arcuate guide passage having an upstream end joined to a substantially straight passage through which the articles are introduced in single file into the guide passage and a rotatably supported star wheel concentrically disposed relative to the arcuate guide passage and having a plurality of teeth with respective outer tips spaced at equal angular intervals and lying in a rotational path extending partly into the guide passage, each tooth having a special profile shape defined by leading and trailing edges, the leading edge having a concave arcuate shape of a radius of curvature which substantially corresponds to the radius of said circular cross section and extending from the tip inward to join the inner end of the trailing edge of the forwardly adjacent tooth, said trailing edge having a convex curved shape and extending outward to the tip of said adjacent tooth, said leading and trailing edges thereby forming a fair S-shaped curve, the leading edge of each tooth being disposed entirely on only one side of a straight line between the tip of said tooth and the center of the star wheel, the star wheel rotating in the direction generally coincident with the travel of the articles in the guide passage.

According to this invention in another aspect thereof, briefly summarized, there is provided a guiding and regulating device as stated above which is utilized and adapted to guide and regulate bottles or the like traveling in single file in a plurality of passages into a single file traveling along an exit passage which is parallel, perpendicular, or in some other state relative to the other passages.

The nature, principle, and utility of this invention will be more clearly apparent from the following detailed description with respect to some preferred embodiments of the invention when read in conjunction with the accompanying drawings briefly described below.

DETAILED DESCRIPTION OF THE INVENTION

Figure 1:
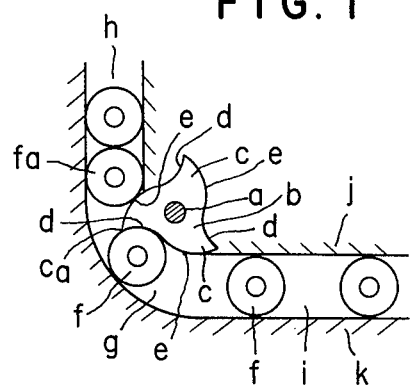
FIG. 1 is a plan view for an explanation of the principle of this invention.

The principle of the guiding and regulating device according to this invention in a conveying system will first be described with reference to FIG. 1 illustrating the case wherein a three-tooth star wheel b having teeth c of special profile shape and rotatably supported on a vertical shaft a is disposed on the inner side of an elbow or bend in a travel path of bottles f the centerlines of which are substantially perpendicular to their direction of travel. This bend in the bottle travel path comprises a guide passage g having a centerline of the shape in plan view of a circular arc concentric with the center of the shaft a and having upstream and downstream ends smoothly joining straight-line passages h and i, respectively. These passages h, g, and i are bounded and defined by guide structures j and k on their left and right sides, respectively, as viewed in the direction of travel of the bottles f.

The leading edge d as viewed in plan view of each of the teeth c of the star wheel b, over the greater part thereof beginning from the outer tip $C_a$ of the tooth c, is of concavely arcuate shape with a radius of curvature substantially corresponding to the outer diameter of each bottle f. The trailing edge e of each tooth c curves convexly rearward from the outer tip $C_a$ and smoothly joins the inner end of the leading edge of the following adjacent tooth c thereby to form a continuous fair curve of S shape together with that leading edge.

While the shaft a of the star wheel b is positioned outside (inner side of the bend) of the guide passage g, the teeth c of the star wheel intermittently project into the guide passage g as the star wheel b rotates. That is, the rotational path of the tips $C_a$ of the teeth c projects into the guide passage g. The above described shape, particularly the leading edges d, of the star wheel b and the related dimensions thereof relative to those of the guide passage g are so selected that, as each bottle f passes through the guide passage g, this bottle f is smoothly engaged by the leading edge d of one of the teeth c.

As bottles f are conveyed in single file along the straight-line passage h and pass through the guide passage g, the star wheel b is pushed and rotates. Each bottle f is then engaged around its cylindrical surface by the leading edge d of a tooth c of the star wheel b and travels in an arcuate path in synchronism with that leading edge d. The succeeding bottle $f_a$ contacts the trailing edge e of the same tooth c, and is regulated in its traveling movement. Then, after this bottle $f_a$ is engaged by the leading edge d of the succeeding tooth c, it travels for the first time in synchronism with the movement of the star wheel b. As a result, for each revolution of the star wheel b, bottles of the same number as the teeth c are sent along the travel path at constant intervals. This regulatory action is the same regardless of whether the group of bottles is being conveyed by a conveyer or whether the bottles are propelled by the star wheel b driven by motive power means. Furthermore, the above described features of configuration and operation of the star wheel are the same irrespective of the plural number of teeth of the star wheel.

The above described principle is applied in the practice of this invention as will now be described with respect to preferred embodiments thereof in conjunction with FIGS. 2 through 8.

Figure 2:
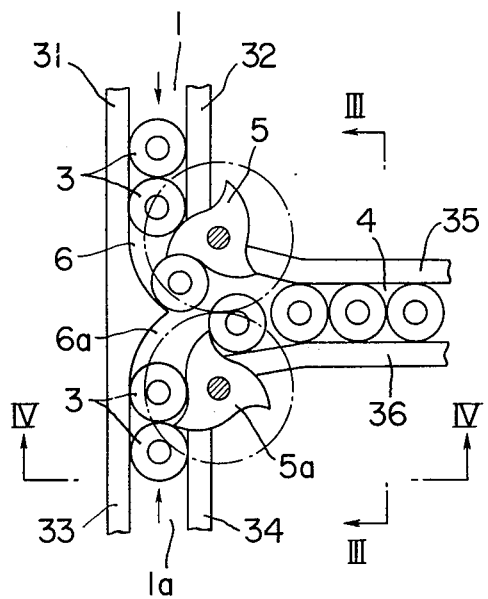
FIG. 2 is a plan view showing an example of a mode of practice of the device according to the invention.
Figure 3:
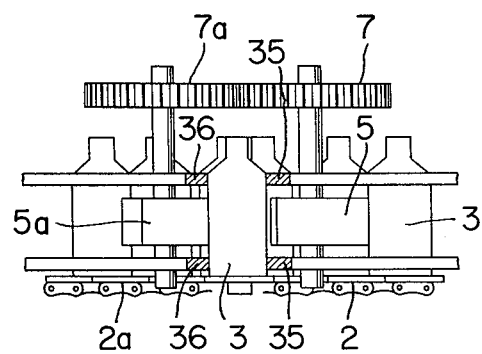
FIG. 3 is a sectional elevation taken along the plane indicated by line III—III in FIG. 2 as viewed in the arrow direction.
Figure 4:
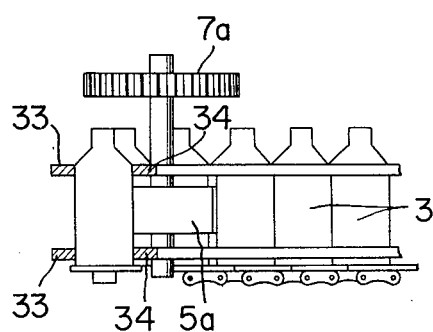
FIG. 4 is a sectional elevation taken along the plane indicated by line IV—IV in FIG. 2 as viewed in the arrow direction.

Referring first to FIGS. 2, 3, and 4, bottles 3 are conveyed in two rows by conveyers 2 and 2a respectively in opposite directions along alined straight-line passages 1 and 1a and are guided by curved guide passages 6 and 6a to merge into a single row to travel along a straight-line exit passage 4, which is perpendicular to the passages 1 and 1a. The passages 1 and 6 are bounded and defined by guide rails 31 and 32, while the passages 1a and 6a are bounded and defined by guide rails 33 and 34. The passage 4 is bounded and defined by guide rails 35 and 36.

Three-tooth star wheels 5 and 5a are respectively provided on the inner sides of the bend portions of the guide passages 6 and 6a and are synchronized by gears 7 and 7a. The star wheels 5 and 5a respectively operate in the same manner as the star wheel b described hereinabove, but the timing of their actions is appropriately matched by the synchronization due to the gears 7 and 7a thereby to afford smooth merging and regulation of the flow of the bottles 3.

Figure 5:
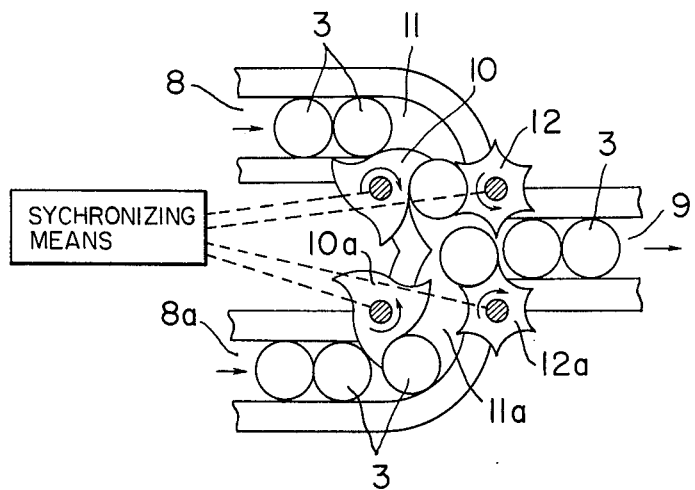
FIGS. 5 through 8 are plan views respectively showing other examples of the device according to the invention.

In another embodiment of this invention as illustrated in FIG. 5, two parallel, straight-line passages 8 and 8a for bottles 3 traveling in the same direction are joined respectively to S-shaped guide passages 11 and 11a, which merge and are joined to a single downstream exit passage 9 through which the bottles 3 travel in the same direction as in the passages 8 and 8a. These passages 8, 8a, 11, 11a, and 9 thus form a Y-shaped flow path for bottles 3. Three-tooth star wheels 10 and 10a are respectively provided at the inner sides of the upstream bends of the S-shaped guide passages 11 and 11a. Six-point or six-tooth star wheels 12 and 12a of the type used in pin-wheel mechanisms and coin counters are respectively provided on the inner sides of the downstream bends of the S-shaped guide passages 11 and 11a.

Bottles 3 sent with matched timing respectively through the parallel passages 8 and 8a are introduced alternately to merge at the entrance of the passage 9, where the star wheels 12 and 12a assist in regulating the flow of bottles and preventing disorder.

Figure 8:
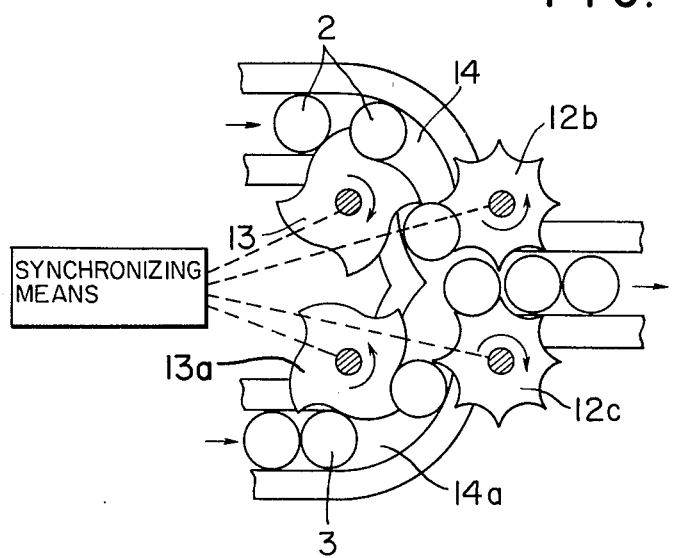

The above described embodiment of the invention can be modified as in the example illustrated in FIG. 8, wherein four-tooth star wheels 13 and 13a are used on the inner sides of the upstream bends of S-shaped guide passages 14 and 14a. Eight-toothed star wheels 12b and 12c are respectively provided at the inner sides of the downstream bends of the S-shaped guide passages 14 and 14a. In other respects the construction and operation of this modification are the same as in the above described embodiment of this invention.

Figure 6:
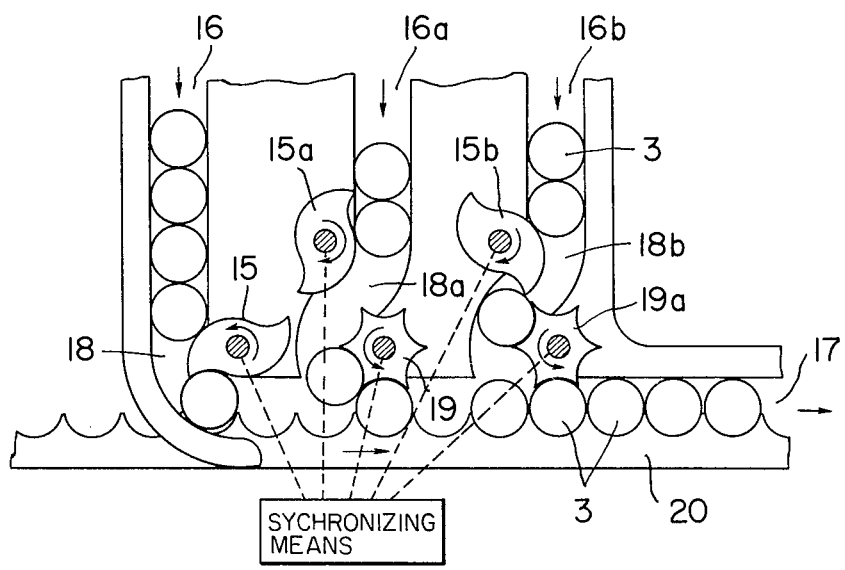

In still another embodiment of the invention as shown in FIG. 6, bottles 3 traveling in the same direction along three parallel passages 16, 16a, and 16b are caused to merge into a single path along a passage 17 at right angles to the passages 16, 16a, and 16b. The passages 16, 16a, and 16b join the passage 17 respectively via an elbow-shaped guide passage 18 provided at the inner side of its bend with a two-tooth star wheel 15 and S-shaped guide passages 18a and 18b provided at the inner sides of their upstream bends with two-tooth star wheels 15a and 15b. These two-tooth star wheels 15, 15a, and 15b function to feed the bottles 3 flowing thereby at relatively long intervals.

The S-shaped guide passages 18a and 18b at the inner sides of their downstream bends are provided with six-tooth star wheels 19 and 19a for timing maintenance. The outflow passage 17 is provided along one lateral side thereof with a timing conveyer 20. Thus, the bottles 3 are fed with matched timing and collected in a smooth and orderly manner to be conveyed along the outflow passage 17.

Figure 7:
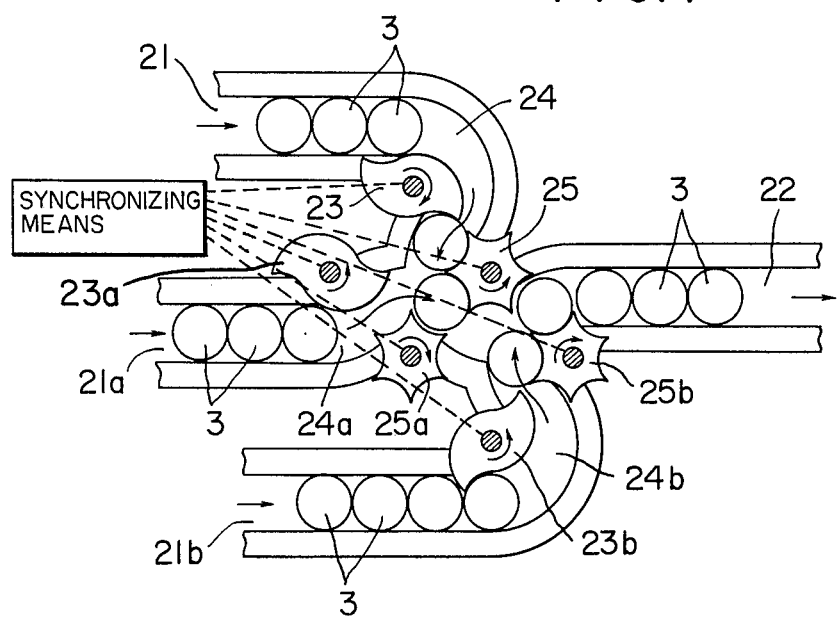

In a further embodiment of the invention as illustrated in FIG. 7, bottles 3 being conveyed in the same direction along three parallel passages 21, 21a, and 21b are collected and sent along a single outflow passage 22 in the same direction as originally. The parallel passages 21, 21a, and 21b are joined to the outflow passage 22 respectively via S-shaped guide passages 24, 24a, and 24b. Two-tooth star wheels 23, 23a, and 23b are provided respectively on the inner sides of the upstream bends of the S-shaped guide passages 24, 24a, and 24b, while six-tooth star wheels 25, 25a, and 25b are provided respectively on the inner sides of the downstream bends of the same guide passages.

In the operation of this junction, first, two bottles 3 respectively from guide passages 24 and 24a are sent, with a vacant space left therebetween for one bottle, toward the outflow passage 22. Then, a bottle 3 sent through the third guide passage 24b is inserted into the vacant space for one bottle, and all three are thus collected and sent out through the outflow passage 22. During this operation, the star wheels 25, 25a, and 25b function to maintain the timings with which the bottles are sent out from the star wheels 23, 23a, and 23b.

While only a few examples of practice of this invention have been described above and illustrated in the drawings, it will be apparent that many other arrangements of star wheels according to the invention in combination with curved guide passages are possible for changing the direction of flow of or merging flows of bottles or like articles in a smooth and orderly manner.

An important feature of the system of this invention is that violent contact or collision of bottles is prevented, and there is very little occurrence of damage to the bottles or generation of noise. Because of the special design of the star wheels used in accordance with the invention, they can exhibit accurate and positive performance by merely being installed as described above without being driven by motive power means. As a result, the construction of the entire system is simplified and made convenient.

In one actual example of practice, the conveying system of the invention was used in a beer bottling process, in which beer bottles, each of 605-gram weight and 75-mm. outer diameter, were fed at a rate of 430 bottles per minute at a speed of 32.3 meters per minute. In comparison with the case where the bottles were collected with only sliding guide means, the noise level was low, and damage to the bottles was greatly reduced. The above stated speed of bottle collection has never been attained heretofore to the best of my knowledge.

What I claim is:

1. A conveyor system for conveying articles of circular section, said system comprising a guide device for automatically guiding and regulating articles travelling in substantially the same direction along three substantially parallel input side straight passages into a single file travelling along an exit passage oriented substantially perpendicularly to said input side straight passages, said guide device comprising:

guide means which define a first guide passage which is arcuate and is joined at the upstream and downstream ends thereof respectively to the downstream end of the most outside one of said straight guide passages and to the upstream end of said exit passage, and second and third guide passages which are joined at their upstream ends to the corresponding input side straight passages respectively and at their downstream ends to the upstream ends of said exit passage, each of said second and third guide passages comprising an upstream arcuate passage portion and a downstream arcuate passage portion, which arcuate passage portions are joined together in tandem with inflected curvature to form a fair S-shaped guide passage;

first, second and third specific starwheels concentrically disposed, respectively, relative to said first guide passage, the upstream portion of the second guide passage and the upstream portion of the third guide passage and supported rotationally in the direction generally coincident with the direction of travel of articles in the respective guide passages, and each specific starwheel having two teeth with respective tips spaced at equal angular intervals and lying in a rotational path extending partly into the respective guide passage, each tooth of each specific starwheel having a special profile shape defined by leading and trailing edges, said leading edge having a concave arcuate shape of a radius of curvature corresponding substantially to the radius of said circular cross section of the articles to be conveyed and extending from the tip inward so as to be joined with the inner end of the trailing edge of the forwardly adjacent tooth, and said trailing edge having a convex curved shape and extending outward to the tip of the rearwardly adjacent tooth, whereby said leading and trailing edges form a fair S-shaped curve adapted for establishing securely a predetermined distance between the output side adjacent articles; and first and second timing establishing normal starwheels which are disposed at the downstream portions of said second and third guide passages respectively, said normal starwheels each having six teeth and symmetrical concave arcuate tooth surfaces the diameter of which corresponds to the cross-section of the articles to be conveyed, whereby the articles fed from said straight passages are merged and entered alternately into said exit passage.

2. A conveyor system for conveying articles of circular section, said system comprising a guide device for automatically guiding and regulating articles travelling in substantially the same direction along three substantially parallel input side straight passages into a single file travelling along an exit passage which is substantially parallel to said straight passages, said guide device comprising:

guide means which define first, second and third guide passages and a merge space, said guide passages being joined at their upstream ends to the input side straight passages respectively and being joined at their downstream ends to the merge space and the merge space being joined to the upstream end of the exit passage, and each of said guide passages comprising an upstream arcuate passage portion and a downstream arcuate passage portion, which arcuate passage portions are joined together in tandem with inflected curvature to form a fair S-shaped guide passage;

first, second and third specific starwheels concentrically disposed relative to the upstream portions of the first, second and third guide passages respectively and supported rotationally in the direction generally coincident with the direction of travel of articles in the respective guide passages, and each specific starwheel having two teeth with respective tips spaced at equal angular intervals and lying in a rotational path extending partly into the respective guide passage, each tooth of each specific starwheel having a special profile shape defined by leading and trailing edges, said leading edge having a concave arcuate shape of a radius of curvature corresponding substantially to the radius of said circular cross section of the articles to be conveyed and extending from the tip inward so as to be joined with the inner end of the trailing edge of the forwardly adjacent tooth, and said trailing edge having a convex curved shape and extending outwardly to the tip of the rearwardly adjacent tooth, whereby said leading and trailing edges form a fair S-shaped curve adapted for establishing securely a predetermined distance between the output side adjacent articles; and first, second and third timing establishing normal starwheels which are disposed at the downstream portions of the first, second and third guide passages respectively, said normal starwheels each having six teeth and symmetrical concave-arcuate tooth surfaces the diameter of which corresponds to the cross section of the articles to be conveyed, whereby the articles to be conveyed are fed from said straight passages, merged in said merge space and entered alternately into said exit passage.

3. A conveyor system for conveying articles of circular section, said system comprising a guide device for automatically guiding and regulating articles travelling in substantially the same direction along two substantially parallel input side straight passages into a single file travelling along an exit passage which is substantially parallel to said straight passages, said guide device comprising:

guide means which define first and second guide passages which are joined at their upstream ends to the input side straight passages respectively and at their downstream ends to the upstream end of said exit passage, each of said guide passages comprising an upstream arcuate passage portion and a downstream arcuate passage portion, which arcuate passage portions are joined together in tandem with inflected curvature to form a fair S-shaped guide passage;

first and second specific starwheels concentrically disposed, respectively, relative to the upstream portions of the first and second guide passages and supported rotationally in the direction generally coincident with the direction of travel of the articles in the respective guide passages, and each specific starwheel having three teeth with respective tips spaced at equal angular intervals and lying in a rotational path extending partly into the respective guide passage, each tooth of each starwheel having a special profile shape defined by leading and trailing edges, said leading edge having a concave arcuate shape of a radius of curvature corresponding substantially to the radius of said circular cross section of the articles to be conveyed and extending from the tip inward so as to be joined with the inner end of the trailing edge of the forwardly adjacent tooth, and said trailing edge having a convex curved shape and extending outward to the tip of the rearwardly adjacent tooth, whereby said leading and trailing edges form a fair S-shaped curve adapted for establishing securely a predetermined distance between the output side adjacent articles; and first and second timing establishing normal starwheels provided respectively at the downstream portions of said first and second guide passages and having respectively six teeth and symmetrical concave-arcuate curves of a radius corresponding to the radius of cross section of the articles to be conveyed, said curves being joined end-to-end at pointed six tips of the starwheel thereby to form a closed star figure, whereby the articles fed from said input side straight passages are merged and entered alternately into said exit passage.

4. A conveyor system as claimed in claim 3, wherein two specific starwheels each having four teeth are adapted as the specific starwheels; and two normal starwheels each having eight teeth are adapted as the normal starwheels.

5. A guide device as claimed in claim 1, 2 or 3, in which means for synchronizing the rotation of the specific starwheels and the timing establishing normal starwheels is provided thereby to guide and regulate the travelling articles in a smooth and orderly manner.

* * * * *